Figure 4:
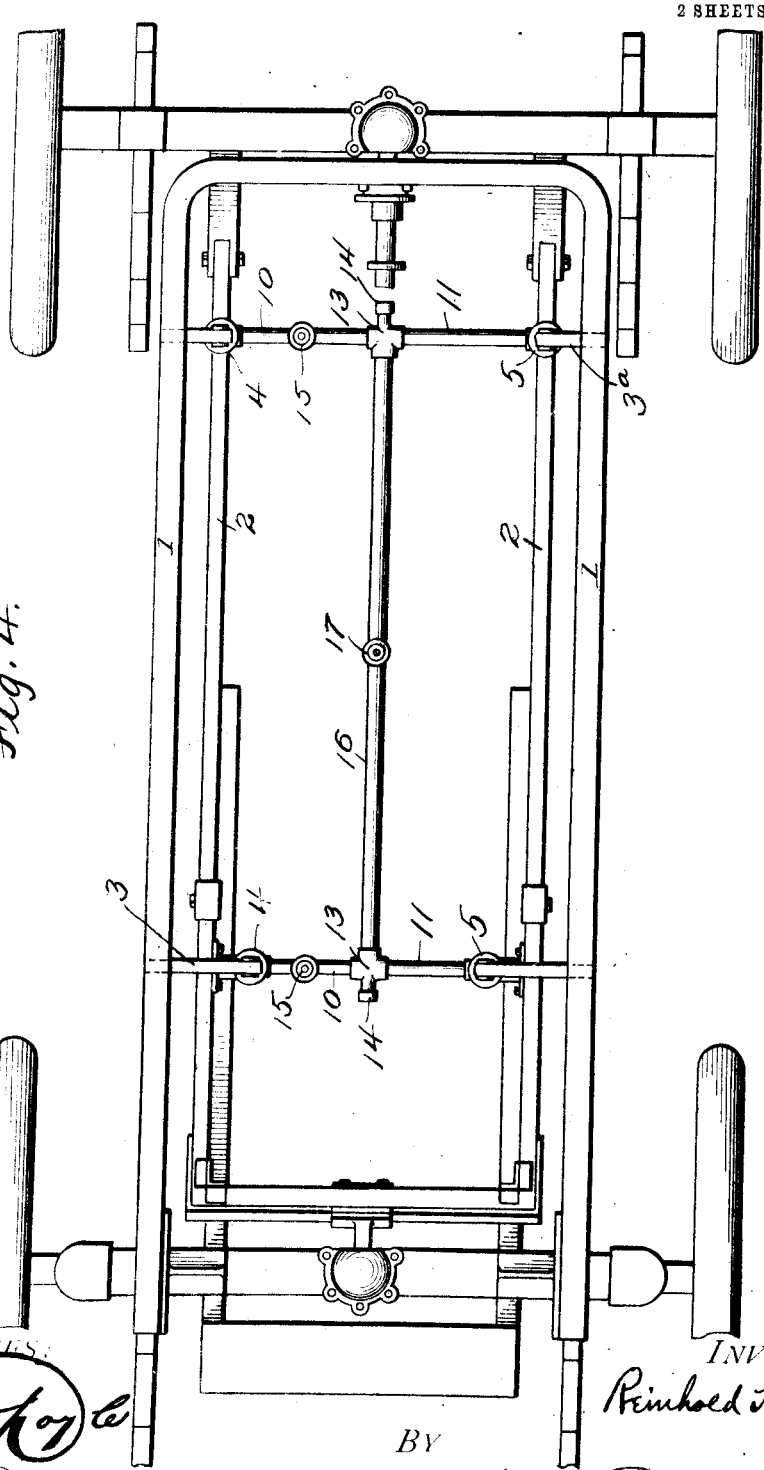

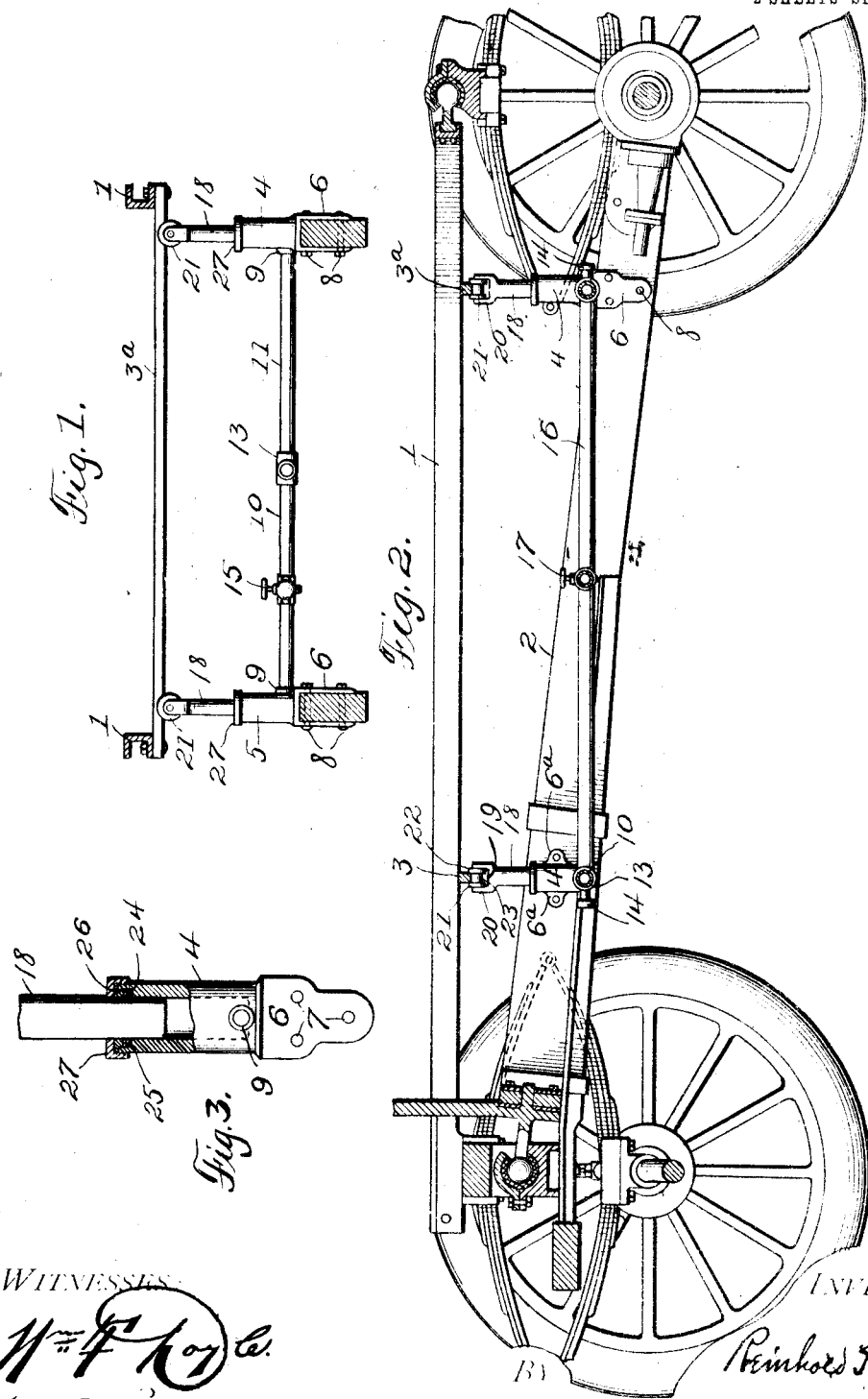

R. HERMAN.
CUSHIONING APPARATUS FOR VEHICLE FRAMES.
APPLICATION FILED JAN. 21, 1908. RENEWED DEC. 10, 1912.

1,064,215.
Patented June 10, 1913.
2 SHEETS—SHEET 2.

UNITED STATES PATENT OFFICE.

REINHOLD HERMAN, OF CRAFTON, PENNSYLVANIA.

CUSHIONING APPARATUS FOR VEHICLE-FRAMES.

1,064,215.

Specification of Letters Patent.

Patented June 10, 1913.

Application filed January 21, 1908, Serial No. 411,880. Renewed December 10, 1912. Serial No. 736,045.

*To all whom it may concern:*

Be it known that I, REINHOLD HERMAN, a citizen of the United States of America, residing at Crafton, in the county of Allegheny and State of Pennsylvania, have invented certain new and useful Improvements in Cushioning Apparatus for Vehicle-Frames, of which the following is a specification, reference being had therein to the accompanying drawing.

This invention relates to motor vehicles of that class embodying a suspension frame or chassis formed of two superimposed frame members and the object thereof is to provide means associating with the upper of said frame members for constituting a cushion for the said upper member whereby the said member will be cushioned when shifted and at the same time causing a reduction of pressure upon the vehicle springs consequently increasing the durability and life of the latter, as well as furthermore reducing shock and vibration to a minimum to those parts of the vehicle carried by the upper frame member, which otherwise would be imparted thereto, when the vehicle is traveling over an uneven road bed or meets with an obstruction.

Futher objects of the invention are to provide a cushioning means as hereinafter set forth for the upper frame member of a two part suspension frame or chassis and which shall be simple in construction, strong, durable, efficient, in its use, readily set up and comparatively inexpensive to manufacture.

As before stated, the invention aims to provide means to constitute a cushion for the upper frame member of a two part suspension frame thereby reducing shock and vibration to the parts carried by the upper frame member when the vehicle meets with an obstruction or travels over an uneven road bed and furthermore at the same time relieving pressure upon the springs of the vehicle and as showing one embodiment of the invention so that it can be clearly understood reference is had to the accompanying drawing which forms a part of this specification, but it will furthermore be understood that changes, variations and modifications can be resorted to which come within the scope of the claims hereunto appended.

In the drawings where like references denote corresponding parts throughout the several views:—Figure 1 is a transverse sectional view looking toward the rear axle of a vehicle showing the adaptation therewith of a cushioning means in accordance with this invention, for the upper frame member of a two part suspension frame or chassis. Fig. 2 is a longitudinal sectional view. Fig. 3 is a detail illustrating one of the cushioning elements, and Fig. 4 is a top plan view of a chassis, equipped with my improved cushioning means.

So that the invention can be readily understood the adaptation thereof is shown by way of example in connection with a suspension frame or chassis formed of an upper and a lower frame member and of a construction similar to that as disclosed in my co-pending application Serial No. 313,525 filed April 25, 1906 and therefore it is thought unnecessary to specifically describe the suspension frame or chassis other than a brief description of those parts which coöperate with the cushioning member of a two-part suspension frame or chassis.

Referring to the drawings in detail, 1 denotes an upper frame member formed with side, front and end bars, at its forward end rigidly connected to the front bolster of the vehicle and at its rear end so connected that the bolster may move without imparting movement to the said frame member. The lower frame member which is indicated by the reference character 2 and is formed of side, front and end bars, is connected at its forward end in a manner similar to that of the connection between the upper frame member and rear bolster and the rear end of the lower frame member 2 is rigidly connected to the rear axle of the vehicle. The foregoing is of known construction and no claim made herein to such construction *per se.* An upper frame member in accordance with this invention, however, is provided with a pair of abutments in the form of narrow and flat transversely-extending bars 3, 3ª secured to the lower face of the side bars of the upper frame member at a point removed from the front and rear bars of the same.

Fixed to each of the side bars of the lower frame member forwardly and rearwardly thereupon, are the cushioning cylinders 4—5, the cylinders 4 being positioned upon one side bar of said frame and the cylinders 5 upon the opposite side bar of the said frame. The cylinders 5 are positioned directly opposite the cylinders 4 and a cylinder 4 associated with a cylinder 5.

Each of the cushioning cylinders 4, 5, positioned at the rear of the frame is provided with a depending yoke 6, the arms of which are apertured as at 7 and the said yokes, when the cylinders are in position, are to straddle the side bars of the lower frame member. Extending through the arms of the yokes and the said side bars of the lower frame member are the holdfast devices 8 which constitute means for fixedly securing the rear cushioning cylinders to the side bars of the frame. Each of the cushioning cylinders 4, 5 positioned at the front of the frame, is provided with laterally extending lugs 6ª whereby the front cylinders 4, 5 can be secured to the side bars of the lower frame member. The front cylinders 4, 5 are so disposed that the tops will be in alinement with the tops of the rear cylinders. Each of the cushioning cylinders is furthermore provided with an inlet nipple 9, the nipples formed on the cylinders 4 being arranged directly opposite the nipples formed on the cylinders 5 and the nipples of the cylinders 4 are connected to the nipples of the cylinders 5 by transversely-extending fluid conducting pipes each formed of two sections 10 and 11 connected together by a four-way coupling 13.

The sections 10 and 11 are secured to the transversely extending branches of the coupling 13 and connected to one of the longitudinally extending branches of the coupling 13 is a check valve 14 of known construction and to which is adapted to be detachably connected a means for supplying fluid under pressure, such as air, steam or water to the conducting pipes whereby the cylinders will be charged with fluid which constitutes a cushioning medium. The conducting pipes not only perform the function set forth, but each also acts as a brace for its respective cylinders as well as constituting a conducting means for the fluid displaced from one cylinder of a pair and supplied to another cylinder of the pair during the cushioning operation. To control the fluid displacement in one cylinder and the supplying of the displaced fluid to the other cylinder of the pair, a manually operated pressure controlling valve 15 is positioned in one of the sections of each conducting pipe, as shown in the section 10 and said valve is so disposed as to govern the discharge of the fluid which is displaced from a cylinder of a pair of cylinders during the cushioning operation. The pressure controlling valves furthermore provide means to prevent any rapid movement of the upper frame with respect to the lower frame as it is evident as before stated, that the displaced fluid can be regulated with reference to the discharging from one cylinder and the conducting of said fluid into the other cylinder. The fluid conducting pipes are connected together by a longitudinally extending branch pipe 16 attached at its ends to longitudinally extending branches of the four-way couplings 13.

In order that the pair of cylinders at the front of the frame may be cut off from the cylinders at the rear of the frame, or vice versa, should a cylinder of either pair be damaged or become inoperative for any cause, I provide a cut-off valve 17 in the pipe 16 which establishes communication between the cylinders at each end of the frame. With this cut-off valve open, it will be obvious that with the air supply connected to either of the valves 14, air will be supplied to all of the cylinders. But with the cut-off valve 17 closed, it is necessary to connect the air supply means with the valve 14 of the particular pair of cylinders it is desired to charge. The provision of this cut-off valve 17 serves an additional function, in that either pair of cylinders may be charged to a greater extent than the other pair, to provide for varying conditions in the load between the front and rear of the vehicle. For instance, if the vehicle is heavily loaded at the rear, the cut-off 17 can be closed, and the pair of cylinders at the rear of the machine supplied with say 90 pounds pressure of air, and the pair of cylinders at the front of the machine supplied with say 70 pounds pressure. Obviously, the cut-off 17 being closed, air cannot be passed from the front pair of cylinders to the rear pair. By this means I am enabled to provide for differential loads on the frame.

Mounted in each of the cushioning cylinders is a vertically movable piston 18 which is of such a length as to project above the top of its respective cylinder and the said projecting end of the piston is bifurcated as at 19 with the arms 20 formed by the furcation carrying the flanged roller 21, the flanges of the roller 21 being indicated by the reference character 22 and arranged at each side of the periphery thereof whereby a groove 23 is provided. The grooves 23 of the rollers 21 receive the abutments which are secured to the lower face of the upper frame member.

To prevent leakage of the compressed fluid past the pistons at the outer ends of the cylinders, each of these latter has its inner face at its outer end cut away as at 24 to provide a seat for the packing rings 25 against which abut a flanged gland 26, the latter secured in position by a flanged interiorly threaded collar 27 engaging threads upon the periphery of the cylinder whereby said collar is secured to the cylinder.

From the foregoing arrangement of parts it is evident that the cushioning cylinders and their pistons are so disposed as to support the upper frame member upon the lower frame member through the medium of the transversely-extending abutments which engage in the grooved rollers 21 and therefore if the upper frame member shifts it would be against the action of the fluid within the cushioning cylinders, consequently the upper frame member would be cushioned and reduce the transfer of shocks and the vibration of the parts carried by the upper frame member to a minimum when the vehicle is traveling over an uneven road bed or meets with an obstruction. Owing to the disposition of the cushioning elements with respect to the upper frame member it is also evident that pressure upon the vehicle springs is relieved to a great extent as the said cushioning elements are independent of the springs of the vehicle. This arrangement increases the life of the vehicle springs.

What I claim is:

1. In combination, a suspension frame embodying an upper member yieldingly-supported at both ends, a lower frame member yieldingly-supported at one end and non-yieldingly but pivotally supported at its other end, and cushioning means carried by the lower frame member and engaged by the upper frame member, said cushioning means constituting supplemental yielding supports for the upper frame member.

2. In combination, a suspension frame embodying an upper member yieldingly-supported at both ends, a lower frame member yieldingly-supported at one end and non-yieldingly but pivotally supported at its other end, and fluid cushioning means carried by the lower frame member, said fluid cushioning means constituting supplemental yielding supports for the upper frame member.

3. In combination, a suspension frame embodying an upper member, yieldingly-supported at both ends, a lower frame member yieldingly-supported at one end and non-yieldingly but pivotally supported at its other end, fluid cushioning cylinders arranged in pairs on the lower frame member, and plungers operating in said cylinders and engaged by the upper frame member, said fluid cushioning cylinders constituting supplemental yielding supports for each end of the upper frame member.

4. In combination, a suspension frame embodying an upper member yieldingly-supported at both ends, a lower frame member yieldingly-supported at one end and non-yieldingly but pivotally supported at its other end, fluid cushioning cylinders arranged in pairs on the lower frame member, plungers operating in said cylinders, connections between said pairs of cylinders, means connecting one pair of cylinders with the other pair, and means carried by the upper frame engaging said plungers, said cushioning cylinders constituting supplemental yielding supports for each end of the upper frame member.

5. In combination, a suspension frame embodying an upper member rigidly connected at its forward end and pivotally-connected at its rear end, a lower frame member pivotally-connected at its forward end and non-yieldingly but pivotally supported at its rear end, fluid cushioning cylinders arranged in pairs on the lower frame member, plungers operating in said cylinders, means establishing communication between the cylinders of each pair, means for closing said communication between the cylinders of each pair of cylinders, means for establishing communication between the pairs of cylinders, means for closing the last named communication, and means carried by the upper frame member engaging said plungers.

6. Fluid cushioning means for automobiles, comprising in combination with a suspension frame, embodying an upper member yieldingly-supported at both ends and a lower frame member yieldingly-supported at one end and non-yieldingly but pivotally supported at its other end, fluid receiving cylinders supported by the lower frame member, plungers mounted in said cylinders and loosely engaged at their upper ends by the upper frame member, said cylinders normally in open communication with each other, and means for closing communication between the cylinders, said fluid receiving cylinders constituting supplemental yielding supports for each end of the upper frame member.

In testimony whereof I affix my signature in the presence of two witnesses.

REINHOLD HERMAN.

Witnesses:
A. M. WILSON,
M. E. LOWRY.